(12) United States Patent
Rambadt et al.

(10) Patent No.: US 11,972,650 B2
(45) Date of Patent: *Apr. 30, 2024

(54) EMERGENCY EQUIPMENT RECEPTACLE AND ALERT NOTIFICATION SYSTEM

(71) Applicant: Grav I.T., LLC, Gravette, AR (US)

(72) Inventors: John Rambadt, Gravette, AR (US); Eric Rambadt, Bella Vista, AR (US); Alan Thomason, Gravette, AR (US); Amy Rambadt, Gravette, AR (US); Bekah Rambadt, Gravette, AR (US); Benny Rambadt, Gravette, AR (US)

(73) Assignee: Grav I.T., LLC, Gravette, AR (US)

( * ) Notice: Subject to any disclaimer, the term of this patent is extended or adjusted under 35 U.S.C. 154(b) by 830 days.

This patent is subject to a terminal disclaimer.

(21) Appl. No.: 16/841,520

(22) Filed: Apr. 6, 2020

(65) Prior Publication Data

US 2020/0234555 A1 Jul. 23, 2020

Related U.S. Application Data

(63) Continuation-in-part of application No. 16/029,954, filed on Jul. 9, 2018, now abandoned.

(60) Provisional application No. 62/830,233, filed on Apr. 5, 2019.

(51) Int. Cl.
| | | |
|---|---|---|
| G07C 9/00 | (2020.01) |
| E05G 1/026 | (2006.01) |
| E05G 1/04 | (2006.01) |
| E05G 1/10 | (2006.01) |
| G07C 9/37 | (2020.01) |
| G07C 9/38 | (2020.01) |
| G08B 25/12 | (2006.01) |

(52) U.S. Cl.
CPC .......... *G07C 9/00563* (2013.01); *E05G 1/10* (2013.01); *G07C 9/00174* (2013.01); *G07C 9/00571* (2013.01); *G07C 9/37* (2020.01); *G07C 9/38* (2020.01); *G08B 25/12* (2013.01); *E05G 1/026* (2013.01); *E05G 1/04* (2013.01)

(58) Field of Classification Search
CPC ............ G07C 9/00563; G07C 9/00174; G07C 9/00571; G07C 9/37; G07C 9/38; E05G 1/10; E05G 1/026; E05G 1/04; G08B 25/12; H04L 63/0861; H04W 12/06

See application file for complete search history.

(56) References Cited

U.S. PATENT DOCUMENTS

| | | | |
|---|---|---|---|
| 6,260,300 B1 * | 7/2001 | Klebes | F41A 17/066 42/70.11 |
| 9,145,728 B1 * | 9/2015 | LeBlanc | E05G 1/024 |
| 9,754,467 B1 * | 9/2017 | Harrison | F41C 33/06 |
| 9,928,676 B2 * | 3/2018 | Rambadt | G08B 25/08 |
| 10,072,454 B1 * | 9/2018 | Roosli | H04N 7/183 |
| 10,810,846 B1 * | 10/2020 | Gonzalez | G08B 13/149 |

(Continued)

*Primary Examiner* — Brian E Miller
(74) *Attorney, Agent, or Firm* — Polsinelli PC

(57) ABSTRACT

This disclosure generally relates to an emergency equipment storage receptacle and alert system. When an active shooter or potential life or death situation should arise, an approved/authorized individual can access safely tools, weapons, first aid supplies, and safety equipment through a single or multi-step authentication process that may include using biometric data, while also contacting the local authorities in the area to alert that there is an active shooter in the facility.

11 Claims, 17 Drawing Sheets

(56) References Cited

U.S. PATENT DOCUMENTS

| | | | | |
|---|---|---|---|---|
| 11,528,454 B2* | 12/2022 | Rabinowitz | | G07C 9/00182 |
| 2004/0247016 A1* | 12/2004 | Faries, Jr. | | G01K 11/12 |
| | | | | 374/E11.018 |
| 2005/0204787 A1* | 9/2005 | Ernst | | E05G 1/10 |
| | | | | 340/568.1 |
| 2007/0215018 A1* | 9/2007 | Faries, Jr. | | A61B 50/10 |
| | | | | 109/38 |
| 2009/0015400 A1* | 1/2009 | Breed | | G07C 9/28 |
| | | | | 340/539.22 |
| 2010/0176917 A1* | 7/2010 | Bacarella | | E05G 1/026 |
| | | | | 312/215 |
| 2011/0175730 A1* | 7/2011 | Stevenson | | G07C 9/00912 |
| | | | | 340/5.73 |
| 2013/0025511 A1* | 1/2013 | Maxwell | | E05G 1/04 |
| | | | | 109/59 R |
| 2014/0104037 A1* | 4/2014 | Sriharto | | G08B 13/2457 |
| | | | | 340/5.61 |
| 2014/0196636 A1* | 7/2014 | Deweese | | E05G 1/00 |
| | | | | 109/23 |
| 2014/0285668 A1* | 9/2014 | Deweese | | H04N 7/188 |
| | | | | 348/156 |
| 2015/0284986 A1* | 10/2015 | Wall | | E05G 1/024 |
| | | | | 109/38 |
| 2016/0053526 A1* | 2/2016 | Dittrich | | E05G 1/026 |
| | | | | 109/38 |
| 2017/0228954 A1* | 8/2017 | Evans | | E05G 1/10 |
| 2017/0231349 A1* | 8/2017 | McLean | | A47B 81/00 |
| | | | | 340/5.52 |
| 2017/0243427 A1* | 8/2017 | Rambadt | | G07C 9/00563 |
| 2017/0306686 A1* | 10/2017 | Penland | | A47B 81/005 |
| 2018/0202738 A1* | 7/2018 | Post | | F41A 17/063 |
| 2019/0055772 A1* | 2/2019 | Penland | | E05G 1/10 |
| 2019/0378398 A1* | 12/2019 | Snakenberg | | G08B 25/10 |
| 2020/0024888 A1* | 1/2020 | Kinnebrew | | E05G 1/10 |
| 2020/0035052 A1* | 1/2020 | Arnold | | G07C 9/00912 |
| 2020/0234555 A1* | 7/2020 | Rambadt | | E05G 1/10 |
| 2021/0125443 A1* | 4/2021 | Lalicki | | G16Y 40/50 |
| 2021/0185138 A1* | 6/2021 | Gant | | G07C 9/32 |
| 2022/0343706 A1* | 10/2022 | So | | G06V 40/14 |

* cited by examiner

EMERGENCY EQUIPMENT RECEPTACLE AND ALERT NOTIFICATION SYSTEM

CROSS-REFERENCE TO RELATED APPLICATIONS

The present application claims priority to U.S. Provisional Application No. 62/830,233, filed Apr. 5, 2019; and the present application is a continuation-in-part to U.S. patent application Ser. No. 16/029,954, filed Jul. 9, 2018. The entire contents of each aforementioned application are incorporated herein by reference.

FIELD

The present disclosure relates to the field of locking storage receptacles. In particular, to the field of storage receptacles for storing a firearm, safety equipment, first aid, or other weapons.

BACKGROUND

The present disclosure relates to locking storage receptacles and locking or disabling mechanisms and controls for firearms, safety equipment, first aid, or other weapons and other devices requiring secured access and, more particularly, to methods and apparatus for preventing unauthorized access to or use of a firearm or other article by securing the firearm or article in a safe box.

SUMMARY

The present application relates to a system for securely storing tools, weapons, first aid supplies, and safety equipment. The system may include one or more locking receptacles for storing tools, weapons, first aid supplies, and safety equipment. The present application also relates to non-storage panic panels that may be activated to send emergency information to emergency contacts and/or local authorities. In various aspects, the present application provides a system for storing tools, weapons, first aid supplies, and safety equipment to protect children and adults from an active shooter situation or other life or death emergency, while also restricting access to those tools, weapons, first aid supplies, or safety equipment during normal situations.

In various aspects, the system includes a storage receptacle capable of transmitting data to emergency personnel and/or portable electronic devices once the storage receptacle is accessed. The storage receptacle may comprise a housing enclosing a recess configured to store emergency equipment. The housing may comprise a housing door configured to move between a locked position and an unlocked position. The housing may further comprise a door locking mechanism that moves between a locked position and an unlocked position. The housing may further comprise at least one camera for taking a photo of a user accessing the receptacle. The system may also include a first access point terminal. The first access point terminal may comprise a biometric recognition system that has a biometric scanning device configured to authenticate an authorized personnel based on biometric information. The biometric information may be chosen from a group consisting of fingerprint data, voice print data, retinal scan data, iris scan data, facial recognition data, or other biometric identification data. The various biometric information data may be used alone or in various combinations thereof to identify a user. The system may also include a communications system configured to contact emergency personnel upon access by authenticated authorized personnel. The communications system may be connected to a communications network and configured to provide an alert notification transmitted via the communications network to a notifying device. The notifying device may be chosen from a group consisting of a central server, a network entity, a mainframe computer system, or a portable electronic device. The transmitted alert notification may comprise data chosen from a group consisting of Global Positioning System ("GPS") location of the receptacle, access time of the receptacle, photographic identification of authenticated authorized personnel, a physical description of the authorized users, and non-GPS-based location information.

The present application also relates to a system that upon activation can simultaneously send a mass message to a list of emergency contacts and/or local authorities to alert them that there is an emergency and provide critical information to expedite a safe response.

The storage receptacle for storing tools, weapons, first aid supplies, and/or safety equipment is mounted within an inset in a wall. If an active shooter or potential life or death situation should arise, the approved/authorized personnel would be allowed to initiate a first authentication process and then complete a second authentication process, according to one aspect. For example, the user may first scan an RFID card for access to the biometric authentication portion. The user then places a thumb or finger on a fingerprint reader or provides other biometric information to another biometric data recognition system that will simultaneously contact the local authorities in the area alerting them that there is an incident in the facility and provide access to the receptacle. In other aspects, a single authentication process may be employed. This typically occurs when one or more storage receptacle devices on the network is operating in an alert mode, thus simplifying the process to access the contents of other receptacles in the near the incident.

According to various aspects, activating both the first and second authentication systems will allow access to the storage receptacle and simultaneously contact the local and/or externally located authorities in the area alerting them that there is an active shooter in the facility. The components of the system including the controller, additional receptacles, and panic panels may also communicate with one another if more than one system component is in the vicinity, illuminating LED lights on an activated system component or on an accompanying application, indicating the presence of an active shooter. The controller, panic panels, and receptacles may also include displays for indicating activation location.

BRIEF DESCRIPTION OF THE DRAWINGS

The following drawings form part of the present specification and are included to demonstrate certain aspects of the present disclosure further. The disclosure may be better understood by reference to one or more of these drawings in combination with the detailed description of specific aspects presented herein. Like numerals represent like components throughout the several views.

DETAILED DESCRIPTION

In various aspects, the devices, methods, and systems disclosed herein relate to substantial improvements over current devices and methods for locking storage receptacles, and locking or disabling mechanisms and controls for firearms, safety equipment, first aid or other weapons and other devices requiring secured access.

Figure 1:
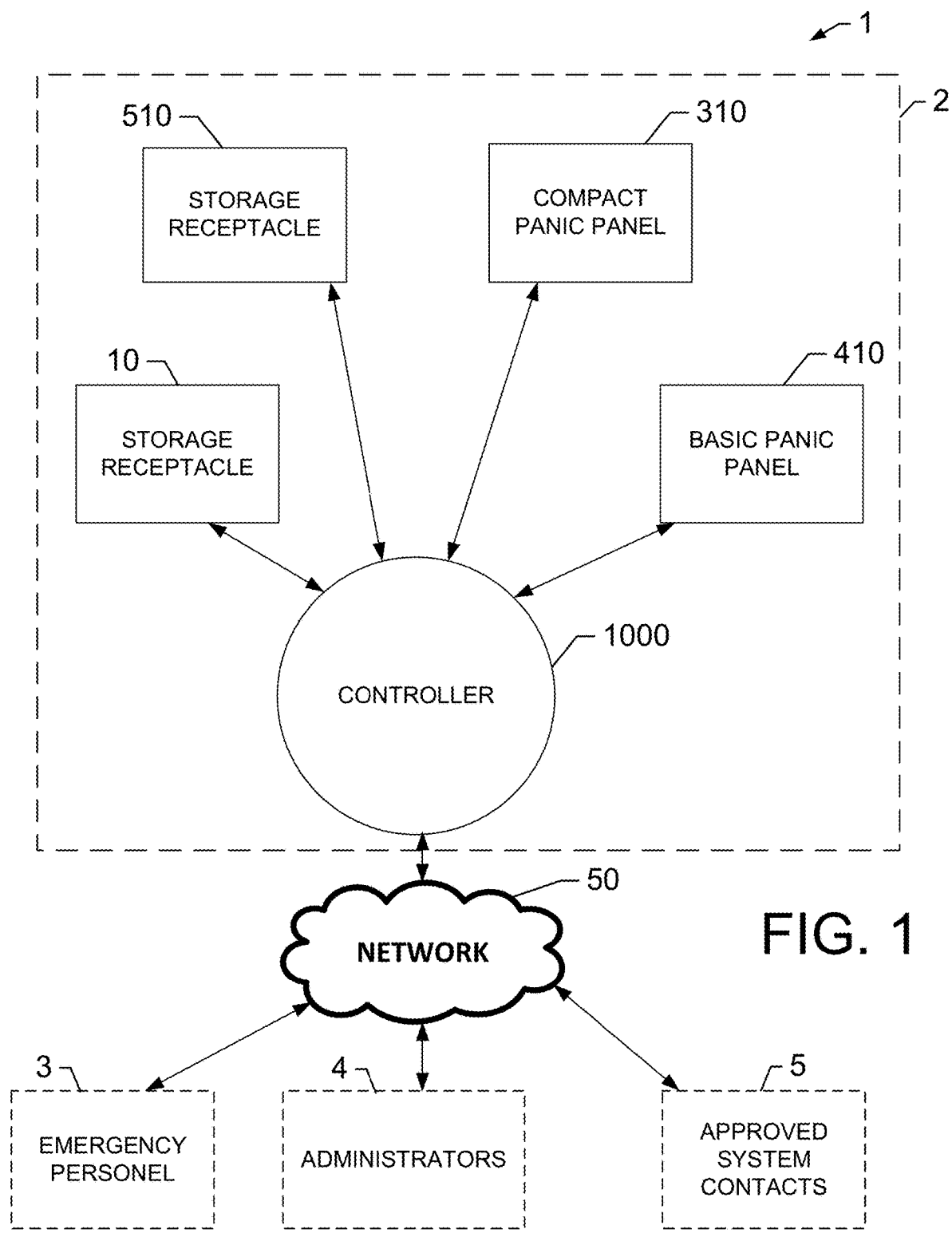
FIG. 1 is a diagram of an emergency equipment receptacle and alert notification system, according to one aspect.

In various aspects, a system for response to an active shooter incident may include one or more interactive emergency devices that may be an emergency equipment storage receptacle, a panic panel, or combinations thereof. The storage receptacles and panic panels are in communication with a central controller that further coordinates alerts, notifications, and communication amongst other receptacles or panels in the system, if present. The controller also generates alerts, notifications, and/or other communications that may be generated to emergency personnel, system administrators and/or approved system contacts. An example emergency response system 1 for response to an active shooter incident is shown in FIG. 1. As shown, at least one receptacle 10, 510, panic panel 310, 410, or a combination of at least one receptacle and at least one panic panel are distributed throughout an environment 2. By way of example and not limitation, the environment 2 may be a public location, a school, retail locations, hospitals, government agencies, movie theaters, private sectors, gas stations, among others.

Figure 5A:
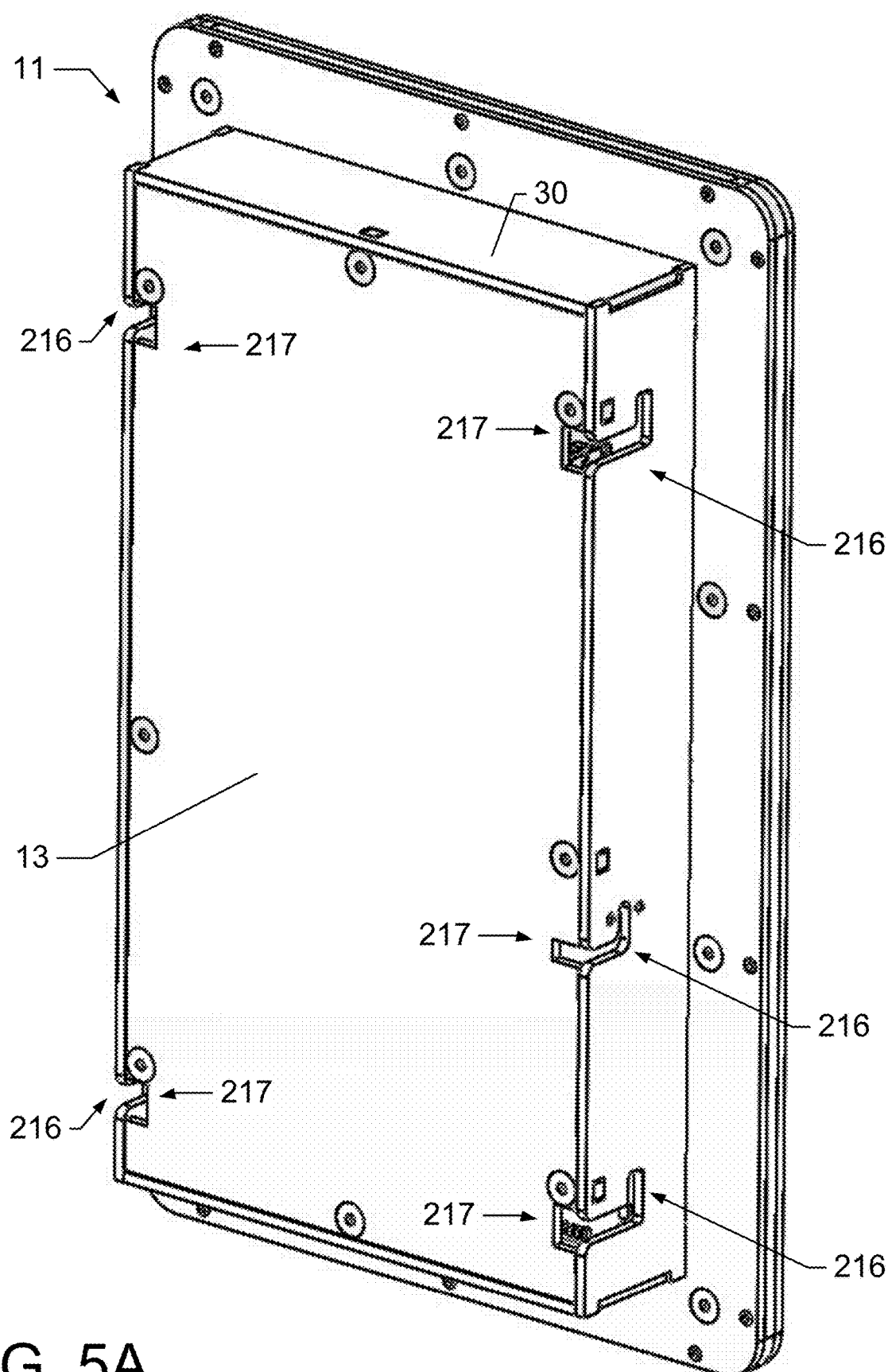
FIG. 5A is a rear perspective view of an emergency equipment receptacle according to one aspect.
Figure 5B:
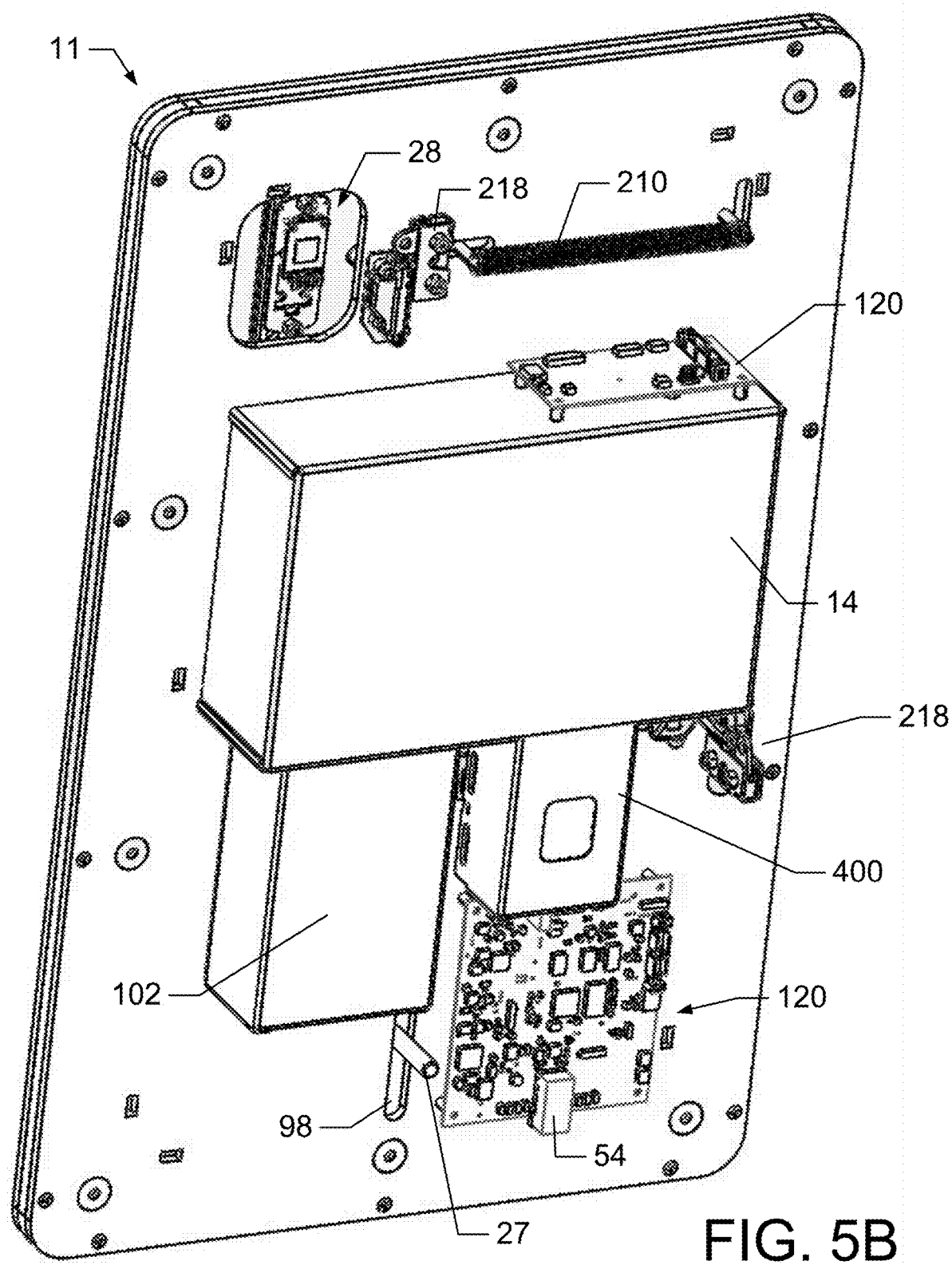
FIG. 5B is rear perspective view of an emergency equipment receptacle with a frame and back cover removed, according to one aspect.
Figure 5C:
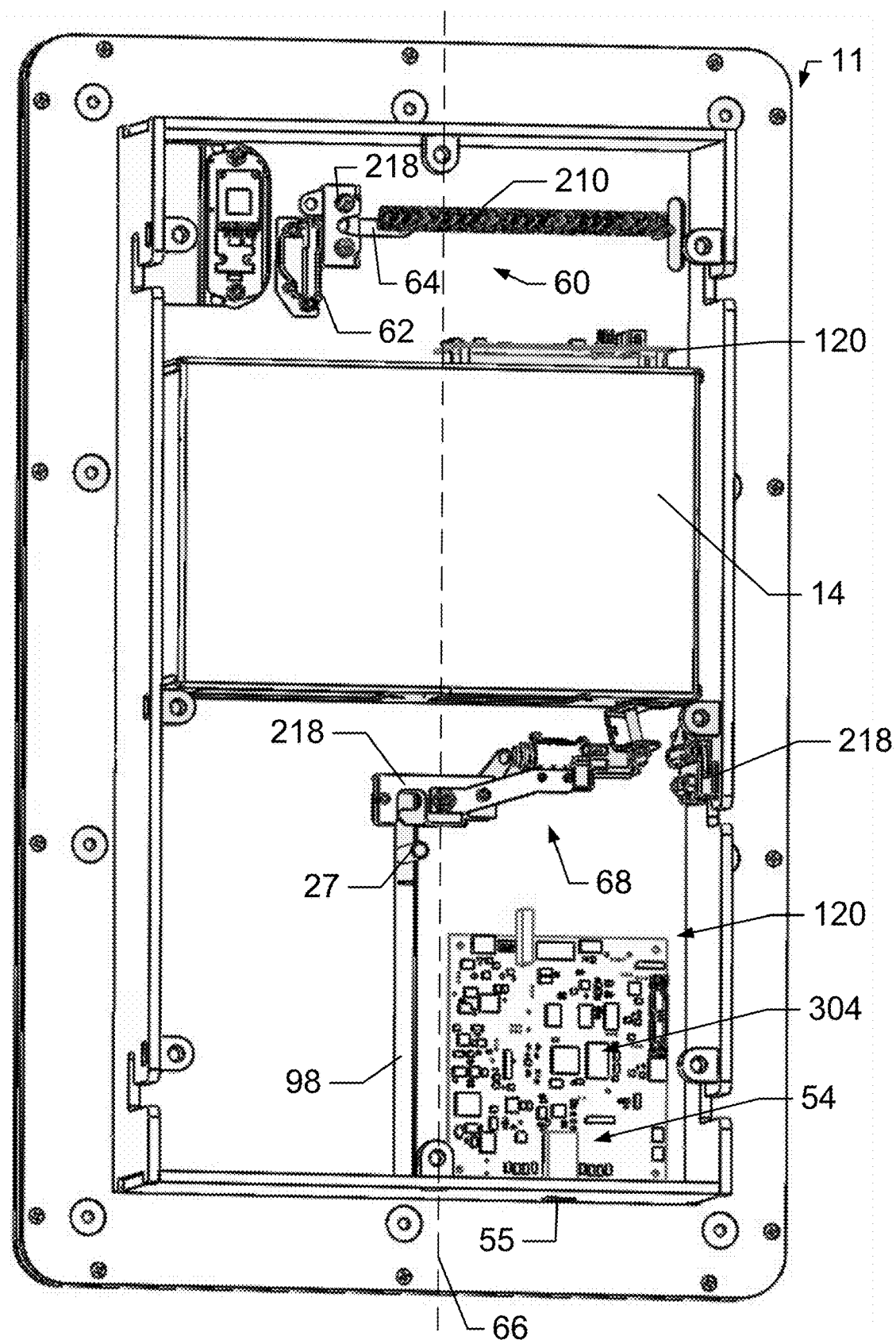
FIG. 5C is rear perspective view of the emergency equipment receptacle of FIG. 5A further illustrating various access panel opening mechanisms, according to one aspect.
Figure 6:
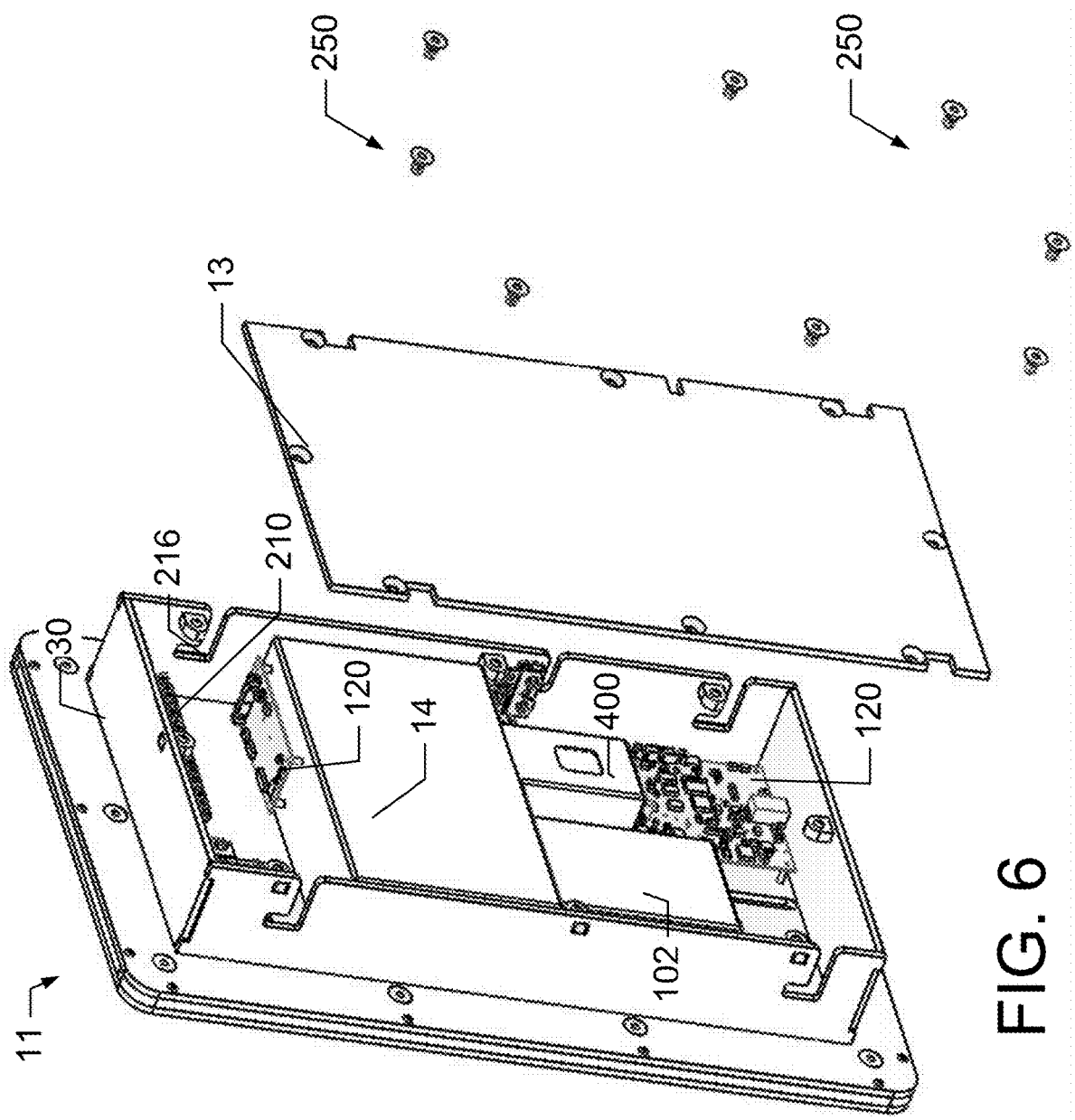
FIG. 6 is an exploded rear view of the emergency equipment receptacle according to one aspect.
Figure 11:
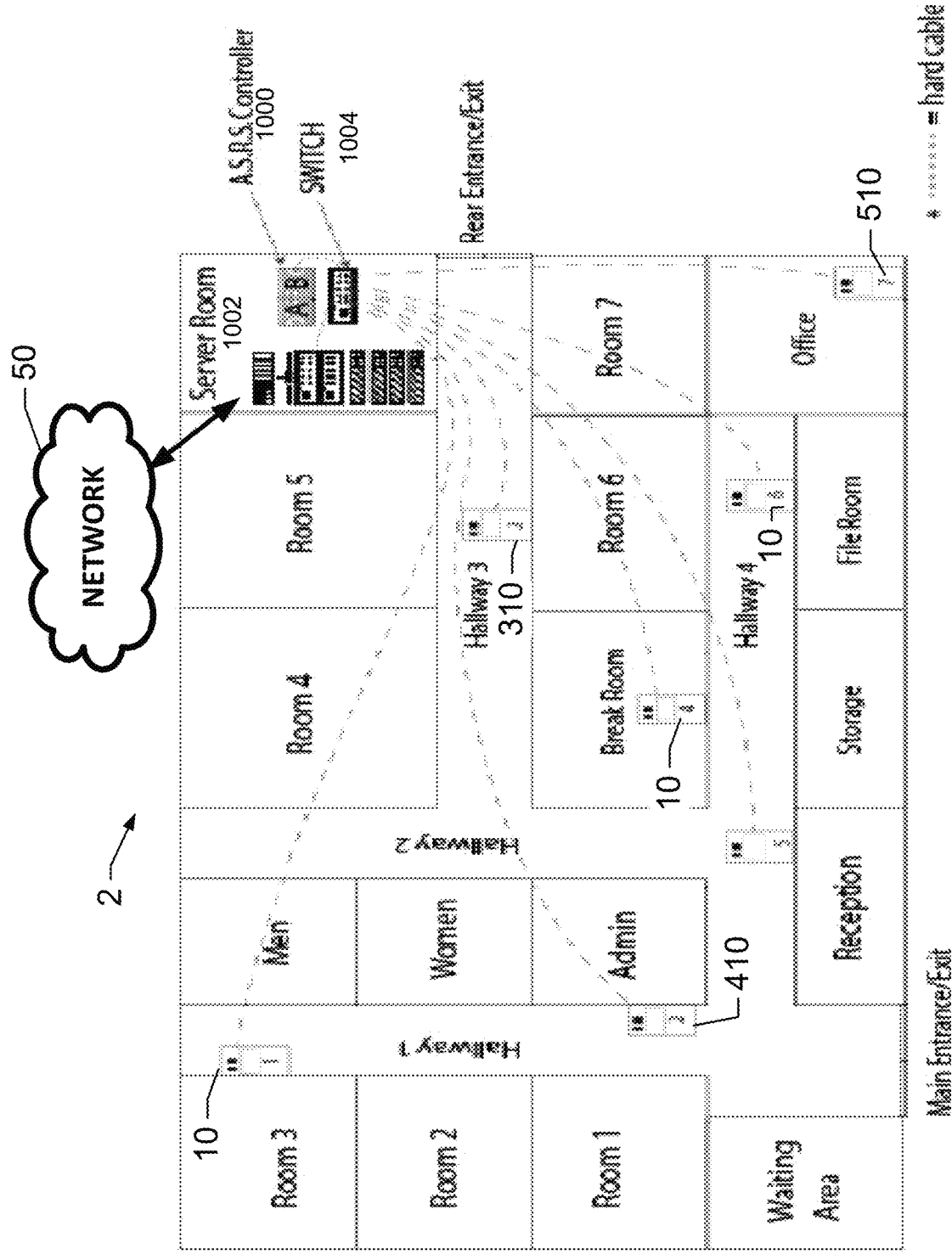
FIG. 11 is a plan diagram of an example environment for deployment of the emergency equipment receptacle and alert notification system, according to one aspect.

According to one aspect, when a receptacle 10, 510 or a panic panel 310, 410 is accessed, an authorized user may perform one or more steps of authentication to initiate a notification communication from the panic panels 310, 410 or the receptacles 10, 510 to a programmable logic controller ("PLC" or "controller") 1000. The controller 1000 sends notification to a list of predetermined or approved contacts 5 alerting them that at least one of the devices (receptacles 10, 510 and/or panic panels 310, 410) has been accessed. In one aspect, the controller 1000 may be located remotely from one or more receptacle or panic panel, as shown in FIG. 11. In an alternative aspect, the controller 1000 may be disposed within the housing of a receptacle or panic panel. In this aspect, the controller may be found in one of the circuit boards 120 of the frame 30, as shown in FIG. 5B-5C. This typically occurs in a system that deploys a single receptacle 10, 510.

Subsequently, the devices may notify the controller 1000 and send the identification data of users. The controller may be further configured to transmit a notification to an additional contact list, alerting recipients that the system has been fully activated, indicating an emergency. In various aspects, the controller 1000 may also be configured to send alerts, notifications, or other communications to external emergency personnel, including but not limited to police, paramedics, or other first responders. In numerous aspects, the controller 1000 perpetually monitors all panic panels 310, 410 and receptacles 10, 510 at a rate configurable by a user or administrator of the emergency response system 1.

Figure 2:
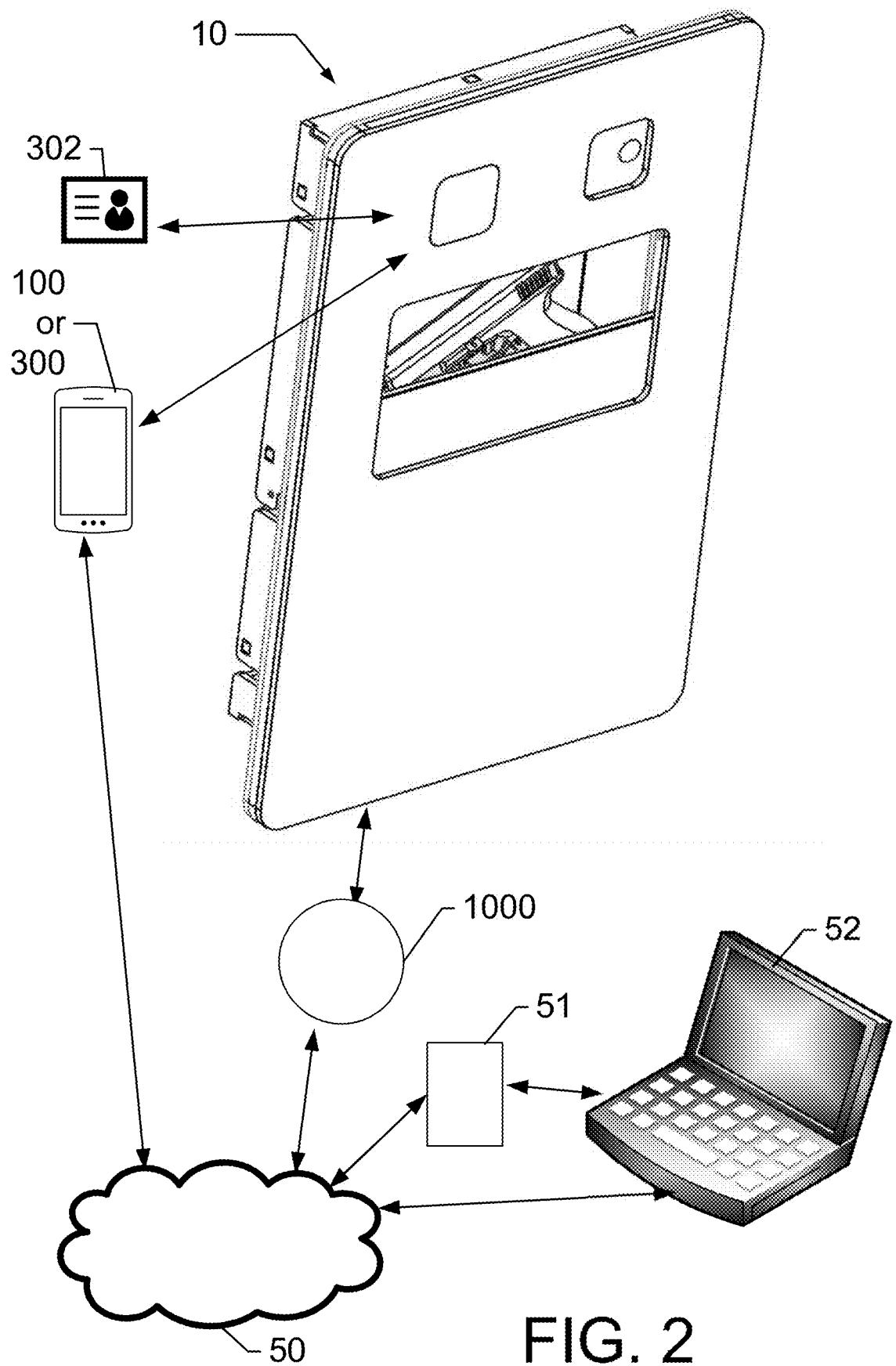
FIG. 2 is another illustration of an emergency equipment receptacle and alert notification system including an example receptacle and example authorization devices according to one aspect.

As shown in FIG. 2, one exemplary aspect of the system includes a storage receptacle 10 having hardware and/or software for transmitting a communication signal to a controller, other storage receptacles 10, 510, panic panels 310, 410 emergency personnel, or portable electronic devices via communication network 50. In various aspects, the communication network may be a wired communication network, a wireless communication network, or combinations thereof. The portable electronic device 100 typically includes devices and mechanisms for wireless communications. As used herein, the term "portable electronic device" may be any device having a processor, memory, and an operating system, capable of interaction with a user or other computer and which can be used for communication using a near-field communication protocol or over a wireless communication network, such as a cellular phone, a walkie-talkie, a personal digital assistant (PDA), a pager, a smart phone, or any combination thereof. By way of non-limiting example, portable electronic device 100 can generally refers to a device that a portable processing device that may include a smartphone, smart watch, tablet computer, and/or the like. Portable electronic devices operative in the present system may run one or more mobile software application to affect the functionality described herein.

As used herein, the terms "wireless communication" and "wirelessly communicate" generally refers to a transmission of communication signals, such as voice signals and/or data signals, between devices. For example, as described herein, a transceiver may wirelessly communicate with a portable electronic device. In addition, as used herein, the term "wireless communication protocol" refers generally to a communications protocol that facilitates transmitting and receiving communication signals over a wireless connection. Examples of wireless communication protocols include but are not limited to Bluetooth®, and Wi-Fi (Bluetooth® is a registered trademark of Bluetooth SIG, Inc., Bellevue, Wash., USA). However, various aspects of the system may utilize other communication protocols.

Figure 3A:
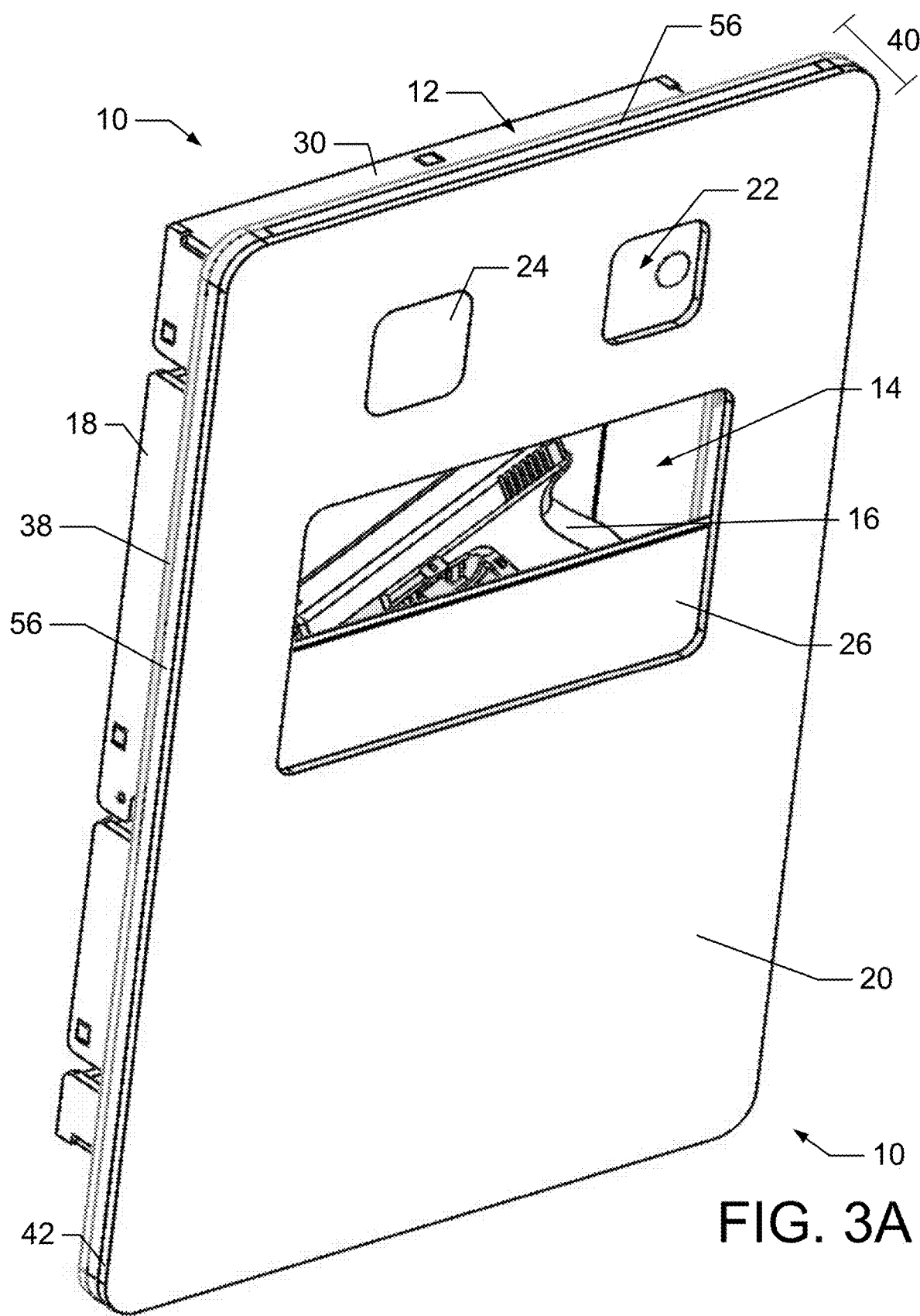
FIG. 3A is a perspective front view of an emergency equipment receptacle according to one aspect.
Figure 3B:
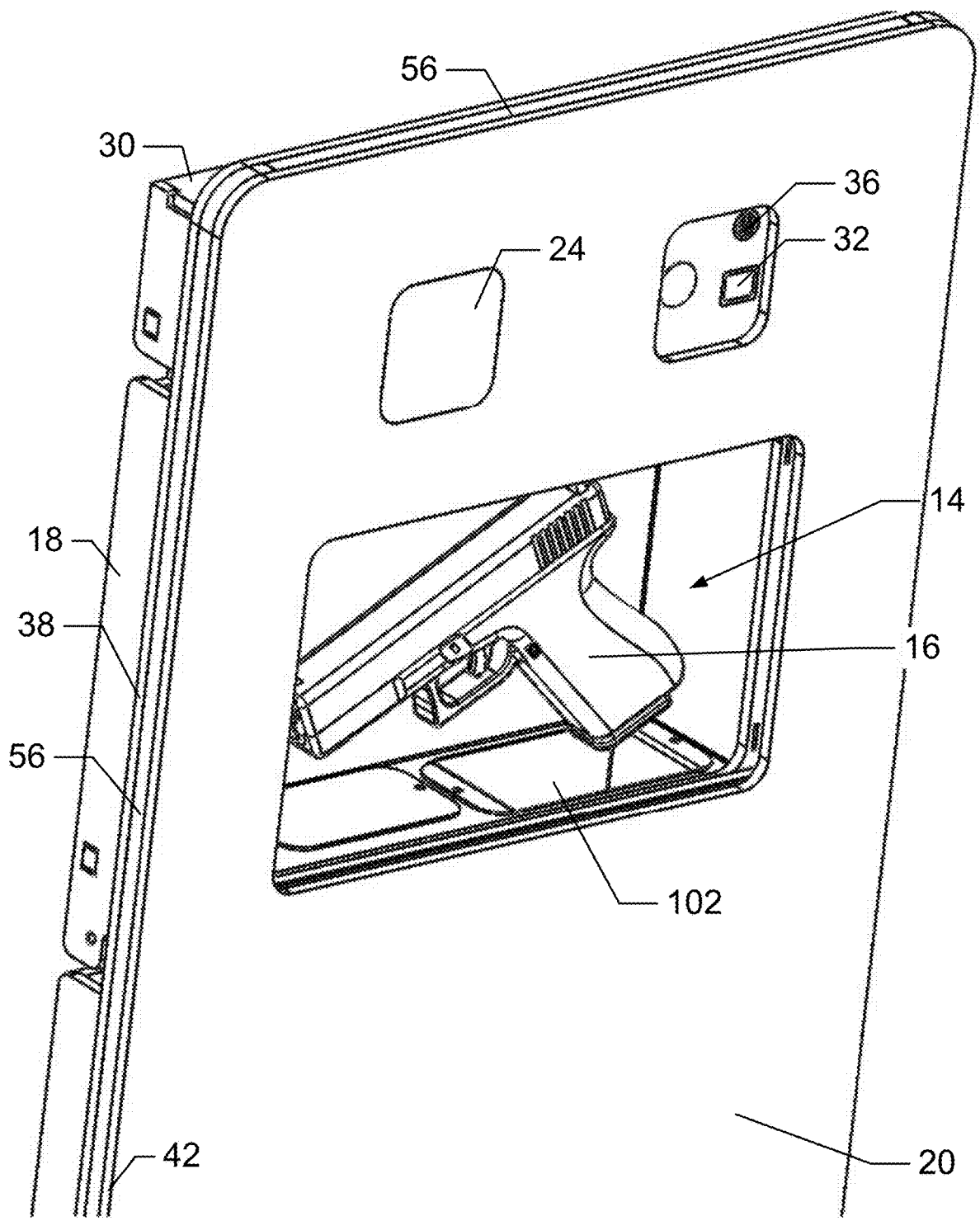
FIG. 3B is a perspective front view of the emergency equipment receptacle of FIG. 3A with an accessible biometric sensor, according to one aspect.

According to one aspect, the storage receptacle 10 includes a housing 12 enclosing a storage recess 14. The storage recess 14 may be dimensioned and configured to hold or store one or more of tools, weapons, first aid supplies, self-defense devices, pepper spray, and/or safety equipment, collectively referred to herein as "emergency equipment". For simplicity, it is to be understood that the term "weapon" as used herein, includes not only pistols, handguns, knives, and small arms, but also swords, staffs, shotguns, long guns, rifles, less-than lethal weaponry, other self-defense devices, and electroshock weapons such as a TASER® stun gun. As shown in FIGS. 3A and 3B, the storage recess 14 is configured to store one or more of tools, weapons, first aid supplies, and safety equipment 16. One of skill in the art will appreciate that the storage recess 14 may be configured for storing any tools, weapons, first aid supplies, and safety equipment known in the art.

Aspects of the emergency response system 1 and method for securely storing tools, weapons, first aid supplies, and safety equipment include one or more receptacles 10, 510 and panic panels 310, 410 that are in communication with a server computing device, (controller 1000), via a communication network. The controller 1000 obtains information such as the status of sensors on or within the receptacles and/or panic panels from the receptacles and panic panels. The sensors may be configured to sense temperature, moisture, light, and vibration/tilt. The controller 1000 may also obtain additional status information from the receptacles and panic panels, including status of battery, operational status of the receptacle or panic panel, fingerprint scanner, door-locking mechanism, biometric scanner, internet and network connection, or camera, among others. The phrase "biometric" as used herein may encompass the act of authentication a person by one of their physical characteristics. The controller 1000, the receptacles 10, 510, and the panic panels 310,410 may store the obtained information in a database 51 and transmit the information to one another and to a user computing device 52. In one example, the user computing device may be a portable electronic device.

Referring now to aspects of the receptacles 10 and 510, as shown in FIGS. 4A-7. In one aspect, the receptacle 10 is a rectangular parallelepiped structure 18 having a longitudinal axis, a rear enclosed frame 30 and front planar face 20 with multiple openings or apertures in the planar face 20 for access within the receptacle 10. The planar face 20 extends outward from the enclosed frame 30, forming a flange 38 that extends around the frame 30. The planar face 20 has a sufficient thickness 40 and an exterior lip 42 to allow circuitry to be installed within the planar face to allow the face 20 to provide communication alerts on the face 20 to the receptacle.

In various aspects, the lip 42 or the face 20 includes lights 56 along the edge of the lip 42 to alert those present if a connected receptacle 10 is accessed. The lights 56 along the edge or periphery of the lip 42 are preferably light-emitting diode (LED) lights that run the entire circumference of the planar face 20, or at least a portion thereof, along the lip 42. These indicator lights 56 may be flush with the lip or raised.

In various aspects, the receptacle 10 may be otherwise shaped, without deviating from the scope of the present inventive concept. For instance, the receptacle 10 may be sphere shaped, cube shaped, rectangular prism shaped, pyramid shaped, or cylinder shaped, without deviating from the scope of the present inventive concept.

Figure 10:
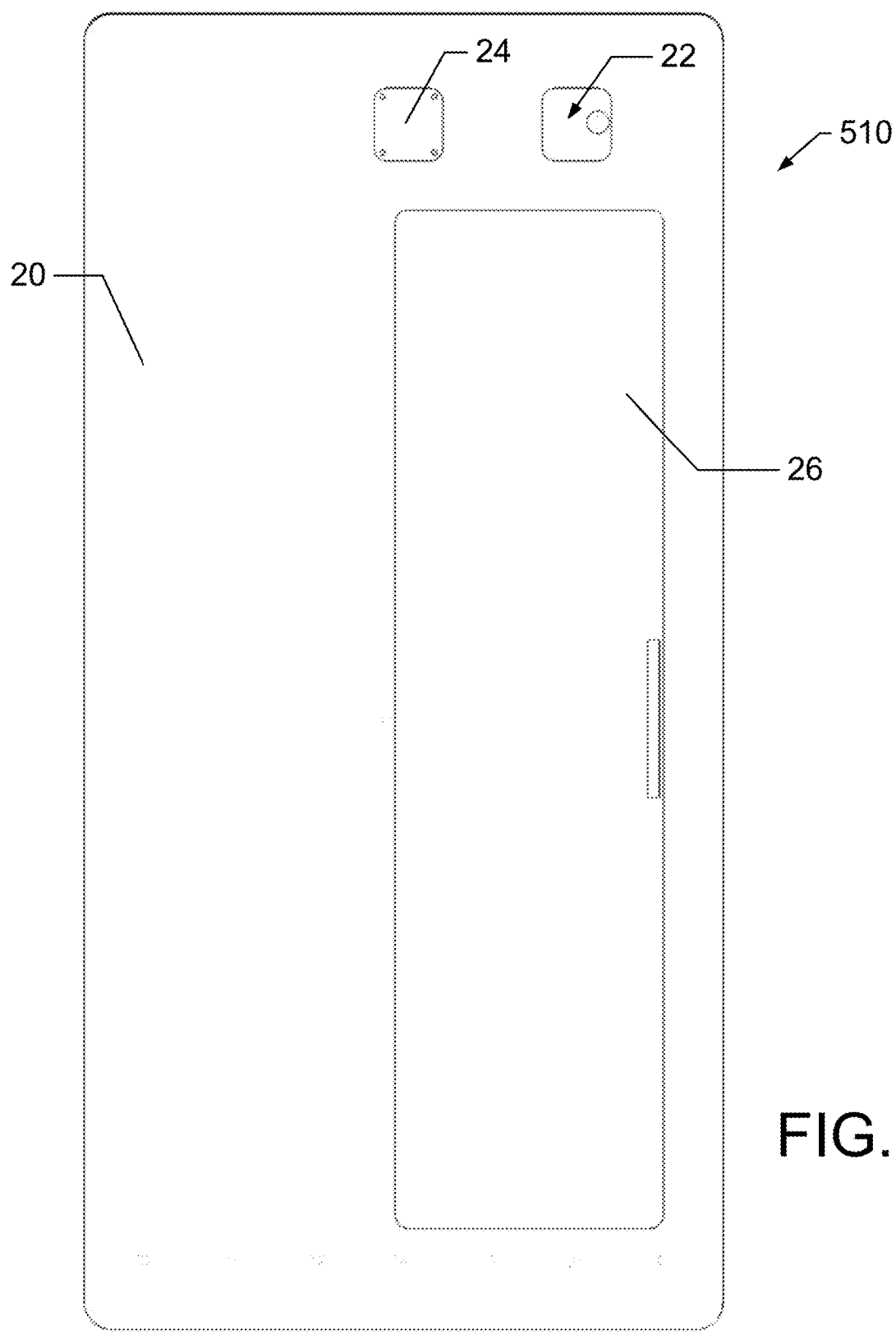
FIG. 10 is a view of a receptacle according to one aspect.

In some aspects, the system may include receptacles of various sizes. For example, as shown in FIG. 10, the receptacle 510 may be used for storing larger equipment such as shotguns, shovels, large medical equipment, and the like. The receptacles 10 and 510 are substantially similar, however the receptacle 510 is configured and dimensioned to secure and store long guns, such as rifles, or other large or extended tools and weapons. In an exemplary aspect, the receptacle 10 is made of military grade steel or other tamper-resistant material, but it is foreseen that any other suitable material may be used, e.g., aluminum, or combination thereof, without deviating from the scope of the present inventive concept.

As shown in FIGS. 3A-3B, the planar front face 20 of openings are secured by one or more movable access panels 22, 26. Access panels 22, 26 cover and limit entry to the emergency equipment 16 stored within the recess 14 of the receptacle 10 and an access point terminal, such as the biometric device 28, respectively.

Figure 4A:
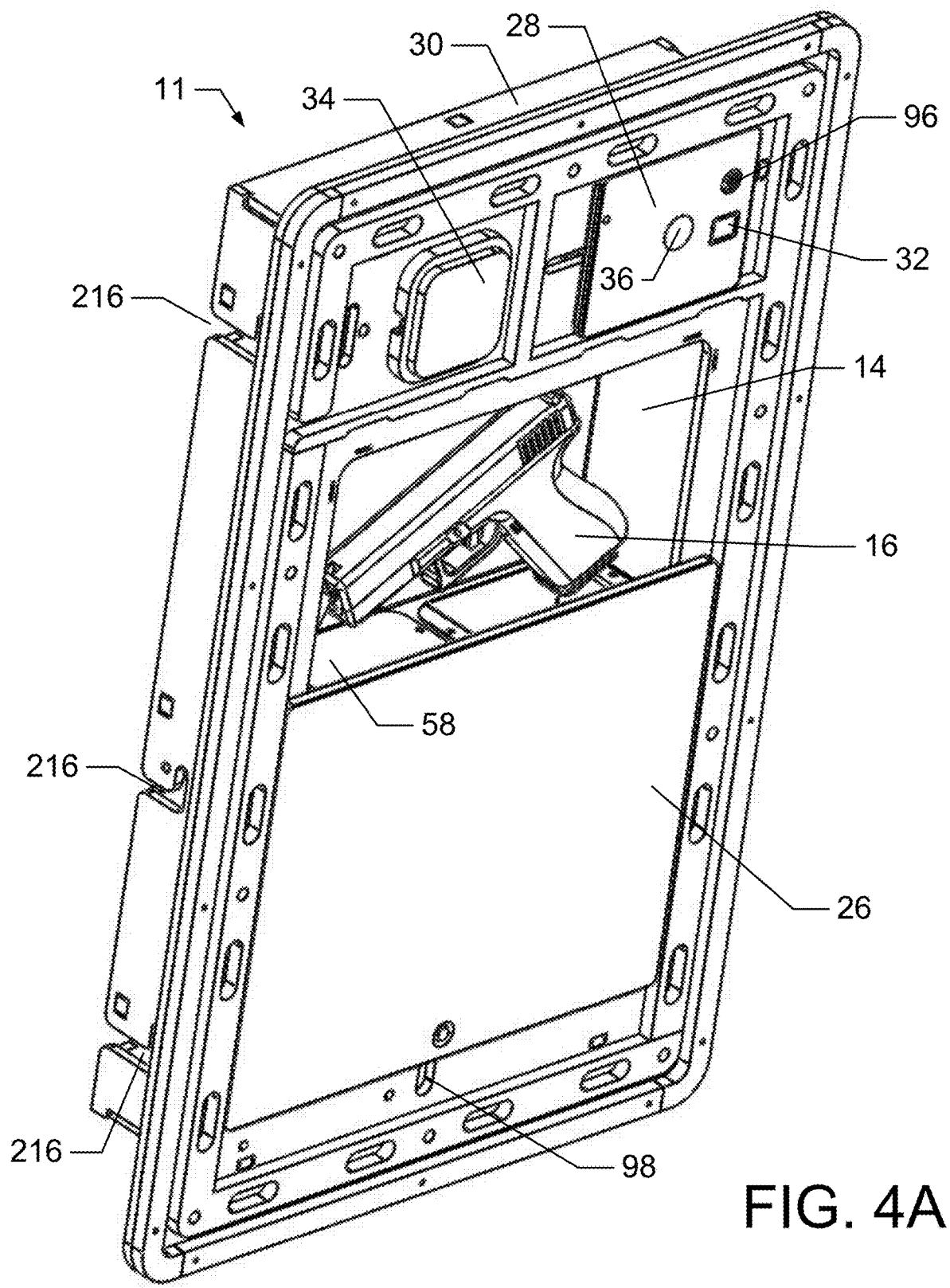
FIG. 4A is a front prospective view of the receptacle with the planar front cover removed and the storage access panel in a lowered position, according to one aspect.
Figure 4B:
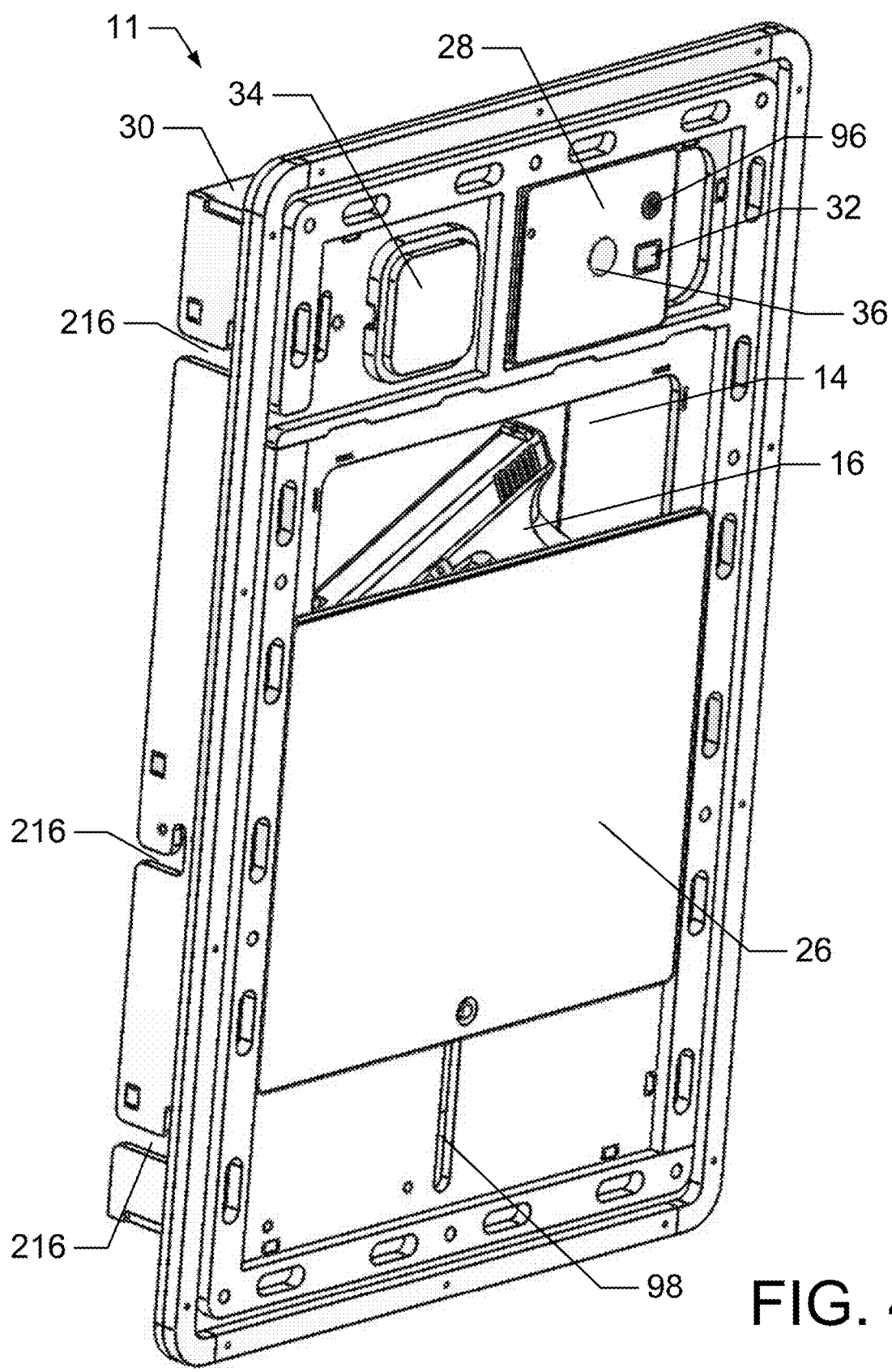
FIG. 4B is a front prospective view of the receptacle of FIG. 4A with the storage access panel in a partially lower position, according to one aspect.
Figure 4C:
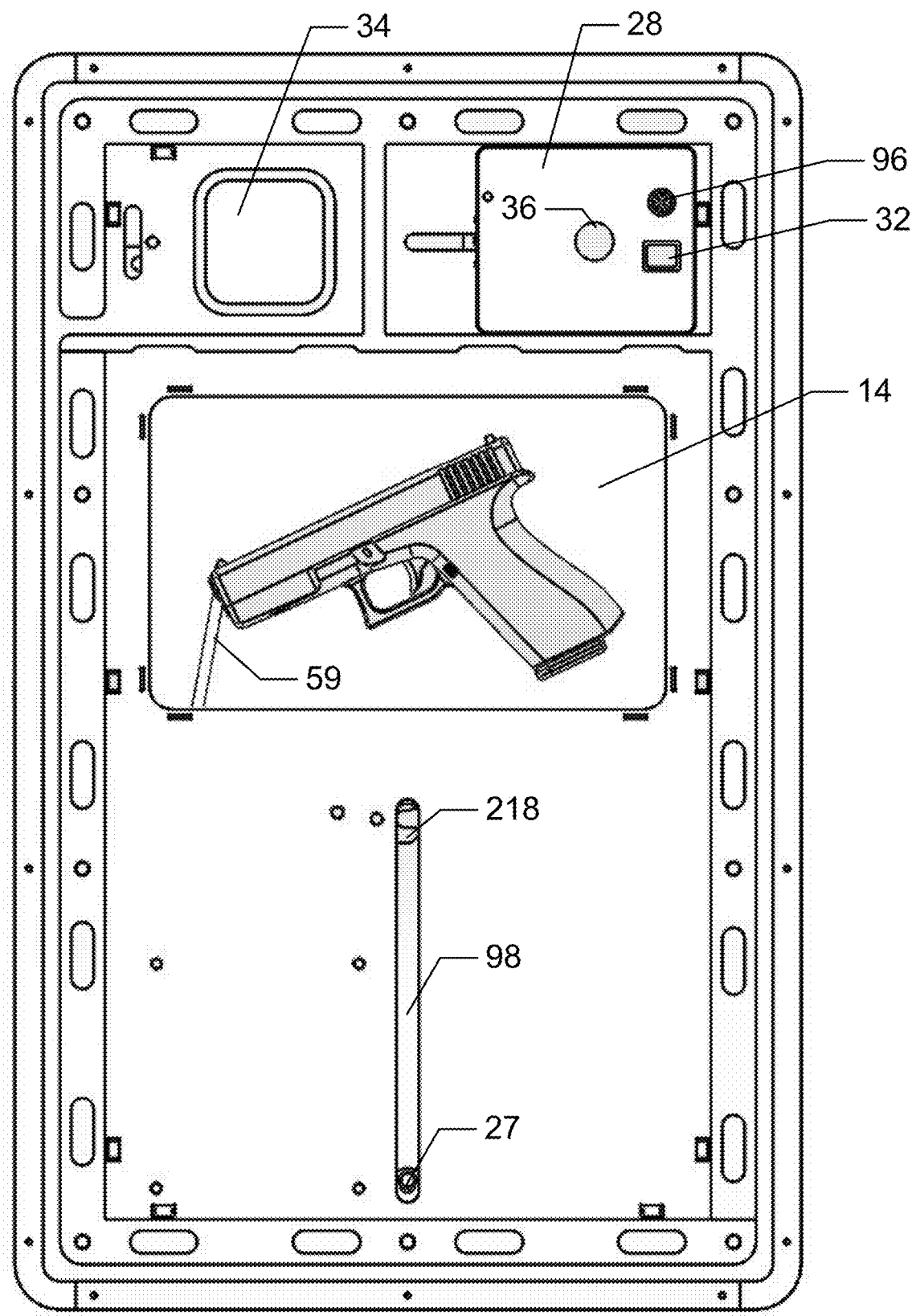
FIG. 4C is a front plan view of the receptacle with a planar front cover, storage access panel sensor aperture panels removed, according to one aspect.

One aspect of the biometric device 28 is shown in FIGS. 4A-C that also depicts the receptacle 11 without the planar face 20. In various aspects, the biometric device 28 is an authentication point on the receptacle 10 and is accessed by proximity to a NFC or RFID chip within a portable electronic device 300 or near field device 302, such as an identification card. A near field or RFID antenna 34 is present within the receptacle behind an access panel cover 24 to receive a signal from the portable electronic device 300 or an identification card, having a near field device 302, as shown in FIG. 2. In various aspects the first, the second, or both authentication steps may be performed using other suitable authentication methods, without deviating from the scope of the present inventive concept. For instance, the authentication may be accomplished using physical code entry such as keypad or PIN Pad, tokenized identification application on a cellular device, physical lock, rotary combination, digital pattern, keyless remote, smart key, or short-range radio transmitter/receiver, without deviating from the scope of the present inventive concept.

Radio frequency identification (RFID) is a technology that may be used for tracking purposes, and may replace bar codes. RFID tags may contain an antenna and memory that stores data. Identifying or reading the data is accomplished using an RFID reader. RFID tags are widespread in the retail industry by helping stores keep track of inventory. RFID tags may also be used to access control systems.

Near field communication (NFC) is a more finely honed version of RFID. It operates within a maximum range of about 4-10 cm and can operate in one- or two-way communication. NFC communication involves the modulation of a magnetic field between two devices, commonly referred to as an initiator and target. The initiator generates the RF field and the target modulates the field using power from the initiator. NFC-enabled features are now commonly integrated into smart phones.

In one example, the "near field communication signal" may operate within a distance of about 1-15 cm or less and at a frequency of about 13.56 MHz. It is also foreseen that the near field communication signal may operate at a distance of less than 4 cm or more than 10 cm without deviating from the scope of the present inventive concept. Near field communication may operate using electromagnetic induction between two loop antennas located within the two loop antennas' near field, forming an air-core transformer between an initiator and target. More specifically an initiator device may provide a carrier field, and the target device may answer by modulating the existing field. The NFC chip may draw its operating power from the initiator-provided electromagnetic field. An "NFC enabled device" as used herein refers to a device such as a smart phone or a tablet computer that acts as an initiator to power the NFC chip. NFC chips include a loop antenna and memory that currently stores between about 96 bytes and 4 MB. NFC chips can be read only but are preferably rewritable. Reading and writing to an NFC chip can be performed using an NFC enabled device loaded with NFC software. The term "NFC chip" is intended to encompass current near field communication standards as well as further improvements that can operate in connection with remaining elements that form the NFC enabled device.

The biometric device 28 as shown uses a fingerprint or thumbprint scanning device 32 or other biometric recognition systems available to authenticate the user of the device for access to the housing and the tools, weapons, first aid supplies, and safety equipment held within. The biometric fingerprint device 32 may operate by conventional means known in the art, such as by activating an actuator upon detecting an authorized fingerprint. It is understood that other suitable biometric systems, not limited to fingerprint or thumbprint systems, may be implemented with the present disclosure, including systems recognizing voice print data, retinal scan data, face detection, and iris scan data. For the purpose of this description, the term "fingerprint" collectively refer to both fingerprint and thumbprint unless specifically stated otherwise.

The biometric device 28 according to the present disclosure may utilize a commercially available fingerprint scanner 32. By way of example, without limitation, the fingerprint scanner 32 may be a commercially available fingerprint scanner, however any other suitable fingerprint scanner devices or technologies may be used. By integrating the biometric data recognition system 28 with appropriate hardware and software, a self-contained system for scanning and processing fingerprint data to control access to, or operation of, tools, weapons, first aid supplies, and safety equipment is provided. Other fingerprint-based or biometric authorization systems are commercially available and may be provided as suitable alternatives.

In various aspects, the biometric device 28 may also include one or more of a camera 36 and a microphone 96 to receive data from a user of the system. The camera 36 is configured to photograph the accessing individual numerous times and communicate to the communications network 50 once the panel 22 is moved and once the biometric device 28 is accessed by the user. Multiple photographs, preferably three, are useful in having a clear image of the accessor of the tools, weapons, first aid supplies, and safety equipment 16. The photographs are then sent through the communications network 50 to a centralized location or to emergency personnel to allow identification of the accessor of the tools, weapons, first aid supplies, and safety equipment. The camera and/or the photographs of the accessor may be analyzed using facial recognition to determine if the accessor is authorized.

In some aspects, the receptacles or panic panels optionally may include a microphone and/or speaker 96 to permit communication via the communications network 50 with authorized contacts or emergency personnel upon accessing the tools, weapons, first aid supplies, and/or safety equipment. In some aspects, the receptacle 10 may include an additional storage compartment 102, as shown in FIG. 3B.

In various aspects, the receptacle 10 may receive power via a power over Ethernet (PoE) device 304 mounted on one or more circuit board 120 disposed within the receptacle frame 30, as shown in FIG. 5B. The POE device 304 may provide power and data to the various components of the receptacle 10 and communication system 54 for accessing a communications network 50 to allow the receptacle 10 to provide wired and/or wireless communication to contact emergency personnel. The receptacle may also include a power supply 400 to provide supplemental power to the components of the receptacle 10 and communication system 54. The power supply 400 may held with a battery compartment 58, shown in FIG. 4A.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another. In one example, the wireless communication network and/or wired communication network 50 is a cellular or mobile telephone technology, where the user might be required to subscribe to a known carrier for accessing the internet.

The communication system 54 could also comprise input/output connectors 55 in with the housing of the receptacle 10. The port connections may include standard connections such as an RJ-11 phone jack, an RJ-45 Ethernet jack, a USB port. In another aspect, the communication system 54 may be access means that include a telephone connection that provides a signal to the authorities. In various aspects, the communication system 54 may include one or more transmitter/receiver for communication using a variety of wired and wireless communications.

According to various aspects, the stored equipment 16 is a firearm secured within the recess 14 by a firearm retention mechanism 59. The firearm retention mechanism 59 may retain the firearm by one or more of a peg, a shelf, a hook, magnet, straps, hook and loop fasteners, or any other suitable devices to retain the firearm within the recess.

In one aspect, as shown in FIG. 4C, the firearm retention mechanism 59 is a barrel peg mounted within the recess 14 and received in the barrel of the firearm. In other aspects, the barrel peg is optional, and may be used alone or in combination with one or more other firearm retention mechanism 59.

As shown in FIGS. 4A, 4B, and 5C, The access panel 26 for the equipment recess 14 is mechanically connected to a locking mechanism 68, such as an actuator 70, that may be manually or electronically operated to operate a rotary latch 218 that retains a release peg 27 further engaged to the access panel 26. Upon successful validation of the user for the biometric device 28, which is communicatively connected via multiple circuit boards 120 to the locking mechanism 68, the actuator 70 releases the access panel 26 to an unlocked position. The peg 27 travels along a lock guide 98 from the locked position to an unlocked position. In one aspect, the lock guide 98 is parallel to the longitudinal axis 66 of the receptacle and, upon release of rotary latch 218, the peg 27 is allowed to fall along the lock guide 98. Alternatively, in another aspect, a spring similar to the spring mechanism 210 is engaged to the release peg 27 to aid movement of the access panel.

Aspects of the locking mechanisms for the access panel 22 are shown FIG. 5C. The locking mechanism 60 for the panel 22 for the biometric device 28 is an actuator 62 engaged to a rotary latch 218 or similar locking device in communication with to the panel 22. The panel 22 is further engaged to a spring mechanism 210. Upon the actuator 62 receiving a signal from the near field antenna 34, the actuator is configured to release the access panel 22 that is retracted via the spring mechanism 210 to move it from a locked position to a released position. As shown, the access panel 22 moves along a lock guide 64 from the locked position to a released position away to the actuator. In one aspect, the lock guide 64 is perpendicular to the longitudinal axis 66 of the receptacle 10. In other aspects, the lock guide 64 may be parallel to the longitudinal axis of the receptacle 10. As can be appreciated by one skilled in the art, the locking mechanisms 60, 68 may be quick-release to allow access to behind the panels 22, 26 quickly.

Figure 7:
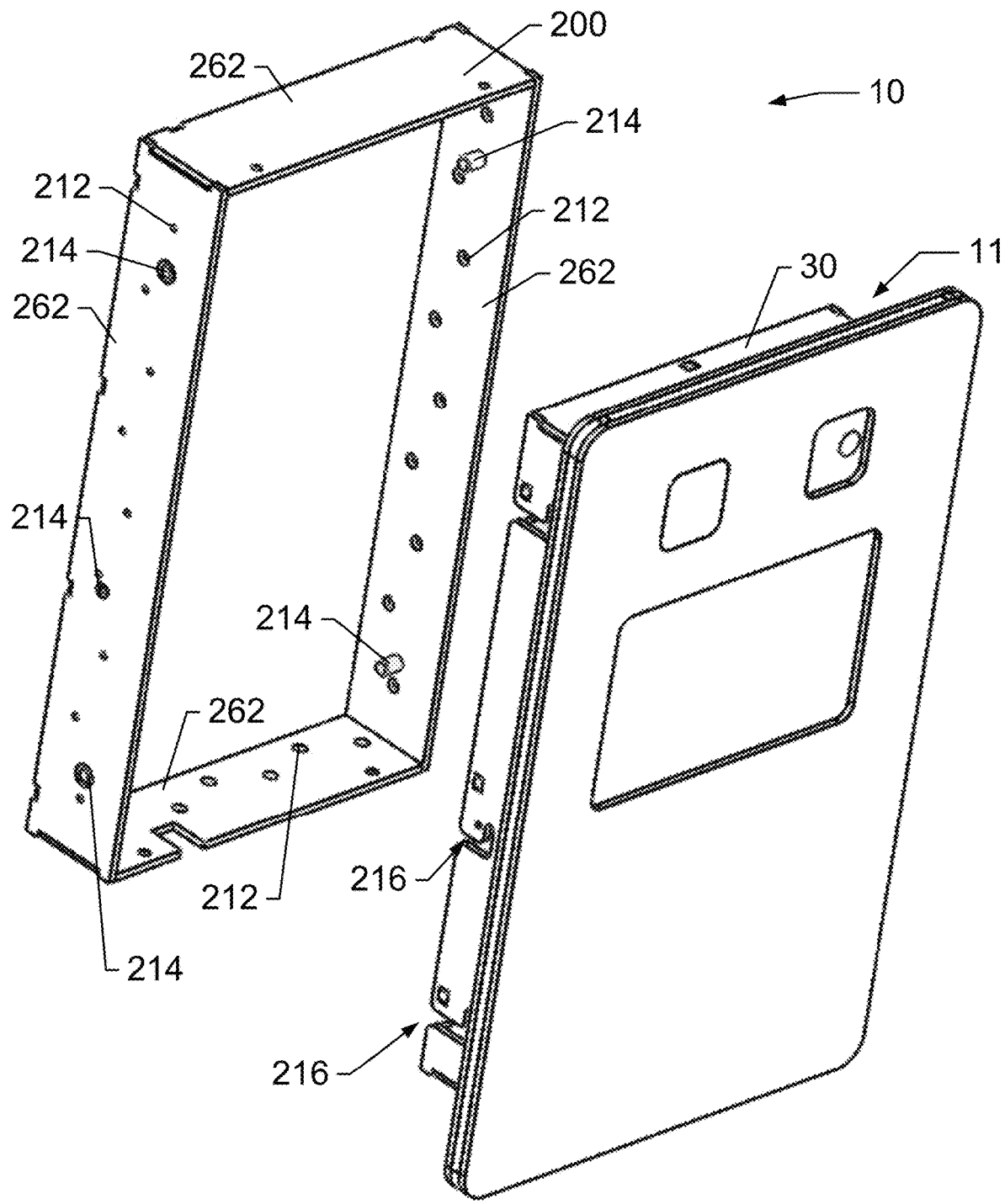
FIG. 7 is a front perspective view of the emergency equipment receptacle and an exterior mounting casing according to one aspect.

FIG. 7 illustrates one example of the receptacle 10 along with an exterior mounting casing 200. The exterior mounting casing 200 is frame assembly for mounting the receptacle 10. Typically, the exterior mounting casing 200 is installed within a recess of a wall and the receptacle 10 is installed within the mounting casing. According to one aspect, the exterior mounting casing 200 includes multiple installation apertures 212 along the frame members 262 of the casing.

By way of example, the fastener apertures 212 are dimensioned to receive fasteners, including but not limited to screws or bolts that may engage studs or other structures within a wall. The exterior mounting casing 200 also includes a plurality of striker bolts 214 that are received in rotary latches 218 within the receptacle frame 30. As shown in FIGS. 4A-4B, 5A-5C, and 6, the frame 30 further defines L-shaped apertures 216 that receive the striker bolts 214. The L-shaped apertures 216 align with corresponding apertures 217 in the insert back panel cover 13 that may be retained by fasteners 250, according to one aspect. The rotary latches 218 are disposed at the terminal ends of the apertures 216. As used herein, the term "aperture" includes but is not limited to holes, slots, slits, openings, and combinations thereof.

In a various aspects, at least two striker bolts 214 are present on the exterior mounting casing 200 that align with corresponding L-shaped apertures 216 and rotary latches 218. Although the rotary latches 218 may be manually actuated, in a preferred aspect, the rotary locks are opened and closed by a corresponding electronic actuator 70, as shown in FIG. 5C, or a spring mechanism 210, functioning similar to an actuator, as shown in FIG. 5B, disposed within the frame 30.

The electronic actuators 70 may be activated by an authorized user of the receptacle 10, or in response to an external device, such as a near field device or other suitable wireless communication device, authorized to activate the actuators. As such, the receptacle 11 may be easily installed or uninstalled for repositioning, if necessary.

Figure 8:
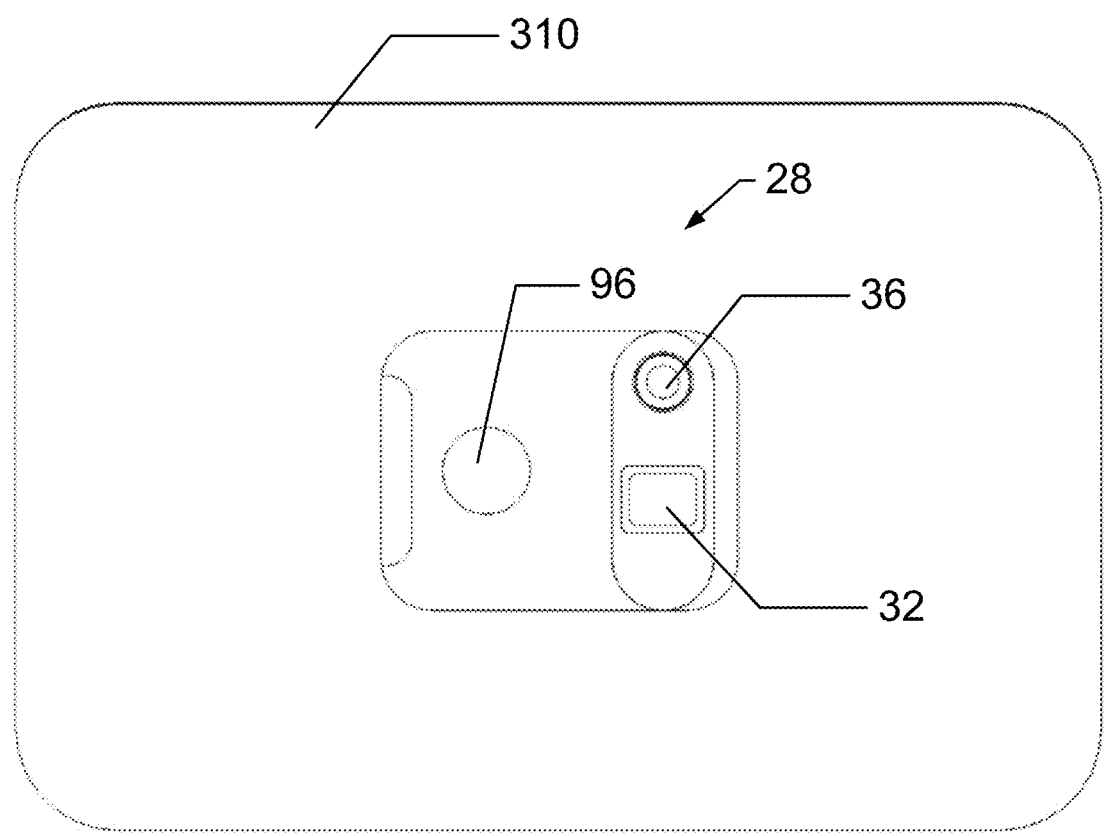
FIG. 8 is a view of a panic panel, according to one aspect.
Figure 9:
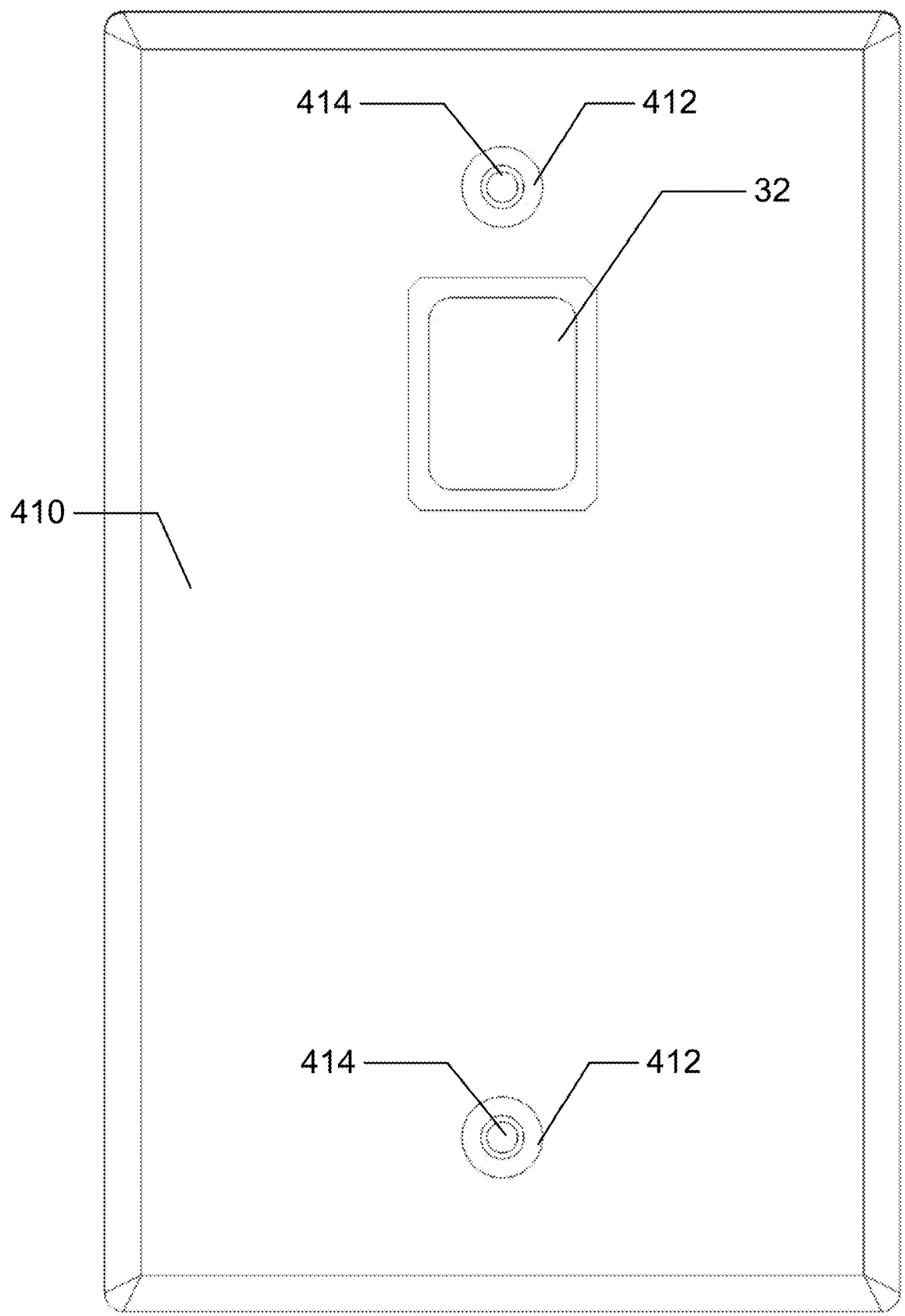
FIG. 9 is a view of a panic panel, according to one aspect.

The system 1 may also include additional units including one or more compact panic panel 310 or basic panic panel 410, as shown in FIGS. 8 and 9, respectably. In one aspect, the compact panic panel 310 may include the same biometric and alert notification functions as the receptacle 10, without having the capacity to store tools, weapons, first aid supplies, and safety equipment. In another aspect, the basic panic panel 410 is similar to the compact panic panel 310; however, the basic panic panel 410 lacks a camera. In one aspect, the basic panic panel 310 includes a panic button that may further include a biometric scanner, such as a fingerprint scanner 32. The basic panic panel is dimensioned to fit within a single, double, or triple outlet box and may include apertures 412 and fasteners 414 dimensioned to fit in commonly used outlet boxes. Similar to the more robust receptacles, the compact and basic panic panels 310 and 410 are likewise in communication with a controller 1000 and configured to provide alerts to the controller 1000.

Another example environment 2 for the deployment of the system 1 is shown in FIG. 11. As shown, as variety of receptacles 10, 510 and panic panels 310, 410 may be deployed a various locations in the environment. As displayed, the receptacles and panic panels may be hard-wired to the server room 1002, the controller 1000, and a switch 1004. In other aspects, one or more of the receptacles and panic panels may communicate with the server room 1002 via wireless communications. In various aspects, the POE devices 304 of the various receptacles and/or panic panels may derive power from the switch 1004 via the controller 1000. As such, the controller 1000 and switch 1004 may selectively communicate with multiple units (receptacles and panic panels) via a wired communication.

Figure 12:
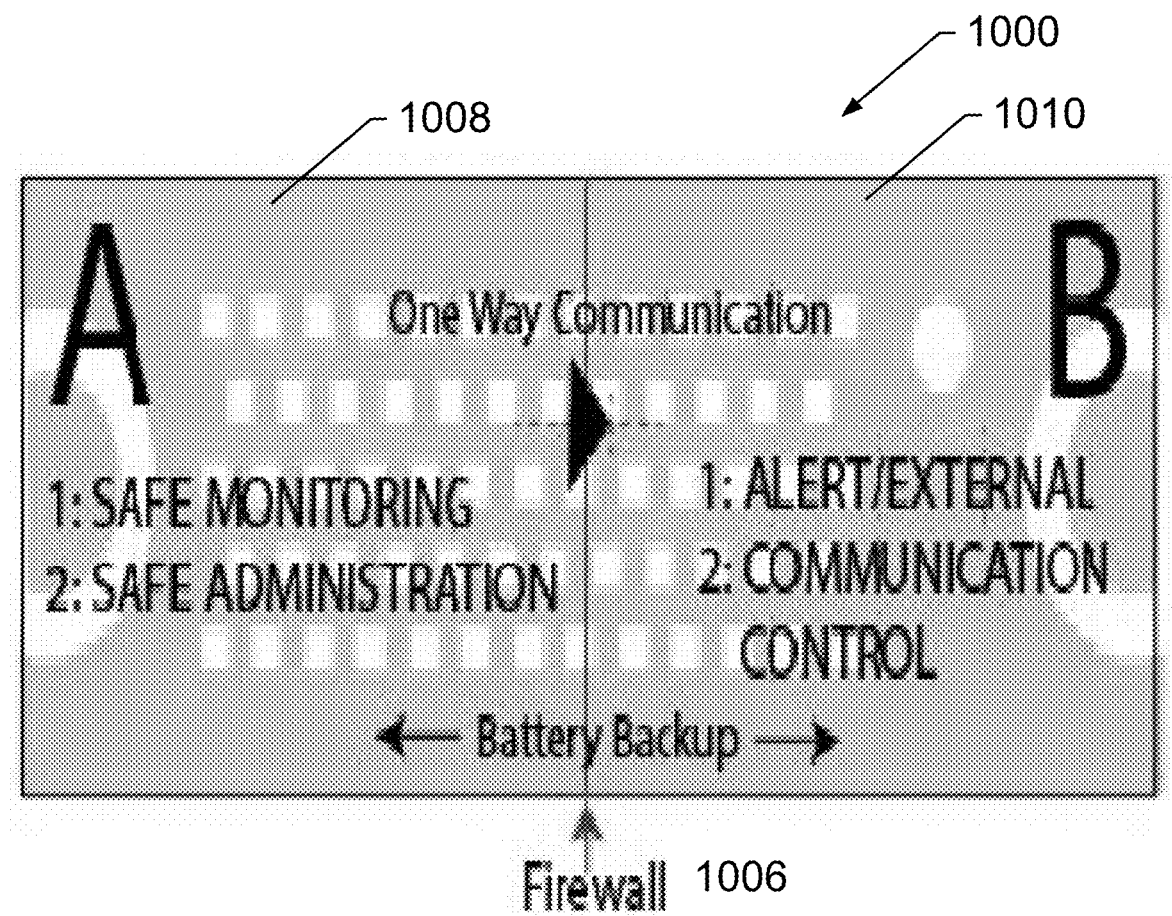
FIG. 12 is a view of the controller, according to one aspect.

The response system 1 includes a controller 1000, shown in FIG. 12. The controller 1000 monitors system notifications. The controller 1000 also registers, removes, and updates user profiles. In this regard, the controller 1000 functions as a network server. The controller 1000 may be a computer that communicates with the other devices within the network. The controller 1000 also stores system data. By way of non-limiting example, the controller may communicate and store user information, device location(s), and emergency contact list(s).

The controller monitors the status of all sensors and statuses of all other devices in the network. The controller also sends notifications regarding activation panic panels 310, 410 and the receptacles 10, 510. The controller 1000 is also configured to alert a full or predetermined and curated contact list in the event that there is an active threat situation. The controller 1000 sends recipients information including exact device location. The controller 1000 sends recipients, information about the authorized user (images, name, etc.). One of skill in the art will appreciate that the controller 1000 may send other relevant information to recipients, without deviating from the inventive concept. The controller 1000 may also send alerts if any component of the system is not functioning properly. The controller may also send alerts if the controller receives alerts or malfunction information from the panic panels 310, 410 or the receptacles 10, 510. The controller 1000 may then send notifications to the full contact list or, alternatively, a curated contact list communicating malfunction information. Additionally, the controller may send alerts to a local or remote system administrator. It is envisioned that alert messages may be sent to a monitoring center. In various aspects, by way of non-limiting examples, the alert, notification, or any communication sent to one or more members of the contact list, may be a phone call, an e-mail, a push notification, a text message, a short message service ("SMS") message, other mobile device notification, or combinations thereof.

In various aspects, the controller 1000 includes a firewall 1006 such that controller functions are divide into an administration portion and a messaging portion. The firewall 1006 may be a physical firewall or may be a software firewall encoded in the controller. In various aspects, when the system 1 is in operation, messages sent via the controller 1000 may not explicitly come from an administration portion 1008 of the controller 1000 that is configured or programmed to monitor and generate commands to the receptacles or panels. In these aspects, the controller comprises a messaging portion 1010 that handles all outward communication. When an alert is triggered via the monitor, a signal is sent by one-way communication to the messaging board.

In one aspect, the controller 1000 includes two separate communication or processing systems or devices, which uniquely control the two separate operating functions of the private and public workflows. The two communication or processing systems, such as the administration portion 1008 and the messaging portion 1010 as shown in FIG. 12, are connected via a one-way data connection, which will prevent communication from the public board to the private board. As such, the private or internal communication portion, such as the administration portion 1008, of the controller 1000 is shielded from external access, as it does not communicate directly with an external communication network, such as the Internet, which is only in communication with the public board, such as the messaging portion 1010. As such, externally located devices or computing systems cannot access the internal or private portions of the overall system, including the receptacles and communication network 50.

The controller 1000 may be configured for creating and adding user profiles to the panic panels 310, 410 and the receptacle 10, 510. In some aspects, an administrator may assign a token/badge, and will take a user's fingerprint(s). In another aspect, adding new users may be automated and not require an administrator. Users may be assigned to a group and given access to specific panic panels 310, 410 and the receptacle 10, 510.

The controller 1000 communicates with the panic panels 310, 410 and the receptacles 10, 510. When a user accesses one of the panic panels 310, 410 or the receptacles 10, 510 via dual authentication the system 1 may enter "alert mode." Alert mode may cause other networked devices to illuminate LED status lights providing visual notification of an activated system; reveal biometric compartment, sound an audible alarm, activate camera to capture images and activity, and activate microphones to monitor activity (if so equipped). Additionally, when in alert mode, other receptacles in the environment, including those proximal to the initial receptacle(s) or panic panel(s) that were previously accessed, may be opened using a single authentication step in order to expedite additional responses to the incident.

The system 1 may further include and integrate security cameras, digital signage, and other safety systems already existing or later provided at the location protected by the disclosed system. The system 1 may also be modular and accept new safety and security devices. By way of non-limiting example, an automatic door locking security system may be notified by the system 1 to go into lock down procedures, causing preselected doors to lock automatically.

Each device in the system may receive from the controller 1000 and store locally data related to authorized users (name, level of authorization, qualifications, qualifications expiration date, contact information, pre-captured images), biometric data, assigned RFID card or badge, assigned NFC card or badge, digital pattern, mobile device token information, PIN pad code, and other suitable user specific authorization information.

Upon boot up the controller 1000, the receptacles 10, 510, and the panic panels 310, 410 may perform a self-diagnostics, reviewing the system 1 for any system malfunctions and irregularities. The system 1 may continue to a "reboot" loop until network connectivity is established. Once components such as the receptacles 10, 510, and the panic panels 310, 410 system have connected and authenticated with the controller 1000, the system 1 components such as the receptacles 10, 510, and the panic panels 310, 410 may send notifications to the controller 1000.

The system 1 and the controller 1000 may monitor one or more maintenance sensors for trigger notifications. If triggered, the system 1 may proceed to initialize the system 1 components such as the receptacles 10, 510, and the panic panels 310, 410. By way of non-limiting example, the system 1 may boot up, checking the status of various components including; LED, RFID/NFC, fingerprint scanner, camera, fingerprint scanner door lock, primary door lock, and wall lock. The LED may indicate that the receptacles 10, 510, and the panic panels 310, 410 are starting up by stepping through a series of colors depending on the prior scans. By way of non-limiting example, the LED may illuminate blue for boot up and red for any malfunctions. One of skill in the art will appreciate that LED may illuminate any color in the visual spectrum without deviating from the spirit of this disclosure. The LED may also flash green when the device is ready. One of skill in the art will appreciate that LED may flash two, three, four, five, or more times without deviating from the spirit of this disclosure. These notifications may be communicated to the controller 1. If the system 1 passes, the system may proceed to the primary loop.

The primary loop may comprise functions including user authentication. The primary loop may end with the primary door a user start with authentication and ends with the primary door opening. The first step of the loop of the primary loop may be a listener step or "pause state" where the system 1, listens for updates from the controller 1000, downloads data, or interactions from the RFID/NFC. If one or more of the system 1 components such as the receptacles 10, 510, and the panic panels 310, 410 determines there is an update the system may download user information or other information and update all users associated to the receptacles 10, 510, and the panic panels 310, 410. The LED may illuminate yellow if the controller 1 sends a request to the particular receptacles 10, 510, or the panic panels 310, 410, the receptacles 10, 510, or the panic panels 310, 410 may continue with the maintenance mode or alert mode request. One of skill in the art will appreciate that LED may illuminate any color in the visual spectrum without deviating from the spirit of this disclosure.

In response to a user attempting to authenticate with an RFID/NFC token, the system 1 LED may turn yellow if the authentication is accepted and biometric door may open. If the token is not accepted the LED may flash red and the receptacles 10, 510, or the panic panels 310, 410 may return to the listening mode.

Once the fingerprint or thumbprint scanning device 32 has been opened the camera may take a series of photos and send those to the photos to the controller 1000 linked to the user account of the scanned RFID/NFC token. In parallel, the fingerprint or thumbprint scanning device 32 may also upload a fingerprint template to the fingerprint or thumbprint scanning device 32 allowing only the fingerprint associated to the appropriate token to open the primary door. The receptacles 10, 510, and the panic panels 310, 410 may go into another "pause state" to wait for a fingerprint scan. If accepted the primary door may open, and if rejected the LEDs may flash red and return to the "pause state" requiring a fingerprint. One of skill in the art will appreciate that LED may illuminate any color in the visual spectrum without deviating from the spirit of this disclosure The tools, weapons, first aid supplies, and safety equipment storage receptacle 10 would then communicate using wireless or wired communications means with controller 1000 that may then transmit messages for display at the other equipment storage receptacles 10 in the area proximal to the incident. The controller 1000 may cause the illumination of LED lights 56 on the receptacles 10 that there is an active shooter.

When an active shooter or potential life or death situation should arise, a method of using the system 1 includes an approved/authorized personnel a near field device 300, 302 approaching a receptacle 10, 510 or a panel 310, 410. Once the near field device 300, 302 is close to the near field antenna 34, the access panel 22 for the biometric device 28 is retracted, as shown in FIGS. 3A-3B. A user can then place a finger on the scanner 32, look into the camera 36, or scan an iris to provide biometric data.

Alternatively, in other aspects, the approved/authorized personnel may access the second authentication point by entering a security code on a key pad having multiple buttons. This further validates access to the tools, weapons, first aid supplies, and safety equipment and thereby allowing release of the access panel 26 limiting access to the tools, weapons, first aid supplies, and safety equipment 16 in the receptacle 10, thereby opening the receptacle 10.

Once the receptacle 10 is open, the communications system 54 provides an alert notification transmitted via a communications network 50 to a notified device such as a central server, network entity, mainframe computer system, or select portable electronic devices to communicate to emergency personnel that access to the equipment recess 14 has been achieved. The communication system 54 also provides a visual alert to the user through activating a light 56 on the outside of the receptacle 10. The alert notification transmitted may include data including a specified location of the receptacle 10, time of access, the accessor information, including physical description, name, and photograph identification. Audio communication from the receptacle 10 to the environment may be activated upon access to the tools, weapons, first aid supplies, and safety equipment 16.

From the foregoing, it will be seen that this invention well adapted to obtain all the ends and solutions herein set forth, together with other advantages that are inherent to the structure. It will also be understood that certain features and sub combinations are of utility and may be employed without reference to other features and sub combinations. This is contemplated by and is within the scope of the claims. Many possible aspects may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open-ended claim language that allows additional elements or structures.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various aspects, it will be understood that these aspects are illustrative and that the scope of the disclosure is not limited to them. Many variations, modifications, additions, and improvements are possible. More generally, aspects in accordance with the present disclosure have been described in the context of particular implementations. Functionality may be separated or combined in blocks differently in various aspects of the disclosure or described with different terminology.

What is claimed is:

1. A storage receptacle configured to store emergency equipment and transmit data to emergency personnel or predetermined contacts upon a user interacting with the storage receptacle, the storage receptacle comprising:
   a housing defining a recess dimensioned to store emergency equipment, the housing further comprising a recess access panel configured to move between a locked position and an unlocked position and a door locking mechanism to retract or release the recess access panel;
   an access point terminal comprising a first authentication system and a biometric recognition system having a biometric device to authenticate an authorized user of the storage receptacle; and,
   a communications system in communication with a controller to generate a notification when the authorized user interacts with the storage receptacle,
   wherein the first authentication system allows access to the biometric recognition system.

2. The storage receptacle of claim 1, where the biometric device captures authorized user data selected from group consisting of fingerprint data, voice print data, facial recognition data, retinal scan data, and iris scan data.

3. The storage receptacle of claim 1, where the controller transmits the notification to at least one of a member of an authorized contact list or emergency personnel.

4. The storage receptacle of claim 1, where the notification comprises at least one of a location of the storage receptacle, access time of the storage receptacle, and photographic identification of authenticated authorized personnel.

5. The storage receptacle of claim 1 further comprising LED lights disposed about a periphery of the housing.

6. The storage receptacle of claim 1 further comprising at least one of a microphone and a speaker.

7. The storage receptacle of claim 1 where the controller is remote from the storage receptacle.

8. The storage receptacle of claim 1, where the controller is disposed within the storage receptacle.

9. The storage receptacle of claim 1, where the controller further comprises a firewall.

10. The storage receptacle of claim 1, wherein the first authentication system is another biometric recognition system, an NFC or RFID reader, a keypad or PIN pad, a tokenized identification application on a cellular device, a physical lock, a rotary combination, a digital pattern, a keyless remote, a smart key, or a short range radio transmitter/receiver.

11. The storage receptacle of claim 1, further comprising an access panel located on the access point terminal, the access panel having a locked position and a released position, wherein when the user is authenticated by the first authentication system the access panel retracts to the released position allowing access to the biometric recognition system.

* * * * *